United States Patent
Cabot et al.

(10) Patent No.: US 7,302,528 B2
(45) Date of Patent: Nov. 27, 2007

(54) CACHING BYPASS

(75) Inventors: Mason B. Cabot, San Francisco, CA (US); Frank T. Hady, Portland, OR (US); Mark B. Rosenbluth, Uxbridge, MA (US); David L. Tennenhouse, Hillsborough, CA (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 10/993,579

(22) Filed: Nov. 19, 2004

(65) Prior Publication Data

US 2006/0112234 A1 May 25, 2006

(51) Int. Cl.
*G06F 12/00* (2006.01)
(52) U.S. Cl. ....................................................... 711/138
(58) Field of Classification Search ................. 711/138
See application file for complete search history.

(56) References Cited

U.S. PATENT DOCUMENTS

| 5,553,270 | A | 9/1996 | Rosenbluth |
| 2003/0041216 | A1 | 2/2003 | Rosenbluth et al. |
| 2004/0024821 | A1 | 2/2004 | Hady |
| 2004/0078790 | A1* | 4/2004 | Wu et al. .................... 717/154 |
| 2005/0038964 | A1 | 2/2005 | Hooper et al. |
| 2005/0071602 | A1 | 3/2005 | Niell et al. |

* cited by examiner

*Primary Examiner*—Hiep T. Nguyen
(74) *Attorney, Agent, or Firm*—Grossman, Tucker, Perreault & Pfleger, PLLC

(57) ABSTRACT

In general, in one aspect, the disclosure describes a method that includes providing a memory access instruction of a processing element's instruction set including multiple parameters. The parameters include at least one address and a token specifying whether the instruction should cause data retrieved from memory in response to the memory access instruction to be unavailable to a subsequent memory access instruction via a cache

25 Claims, 7 Drawing Sheets

FSB [cmd, xfer, src_op1, src_op2, ref_cnt], No_Allocate
     64    66                                  74
           68    70         72

FSB [cmd, xfer, src_op1, src_op2, ref_cnt], No_Allocate, Cache_Way
     64          68       70       72        74           162

CACHING BYPASS

BACKGROUND

Some processors, in particular, general purpose processors, allow a type of caching (called "memory type") to be specified for selected areas of main memory. For example, page cacheability attributes and Memory Type Range Registers (MTRRs) can be used to determine cache attributes of memory bus accesses. Such memory types can include Uncacheable (UC), Write-Through (WT), Write Back (WB), Write Protected (WP) and Write Combining (WC) memory types. If the UC memory type is specified, the selected area is not cached. For the WT memory type, writes to and reads from the selected area are cached. Reads come from cache lines on cache hits and read misses cause cache line fills. All writes are written to a cache line and through to the main memory. The WT mechanism enforces coherency between the cache and the main memory. With the WB memory type, writes to and reads from main memory are also cached. Reads come from cache lines on cache hits, and read misses cause cache line fills. Write misses cause cache line fills, and writes are performed entirely in the cache, when possible. A WB operation is triggered when cache lines need to be deallocated. For a WP memory type, reads come from cache lines when possible, and read misses cause cache line fills. Writes are propagated to the system bus and cause corresponding cache lines on all processors on the bus to be invalidated. When WC is used, main memory locations are not cached, and writes may be delayed and combined in a write buffer to reduce memory accesses.

Memory regions that are marked as UC can only be read and written in sub-cache line sizes, resulting in low performance for those memory regions. The WC memory type offers higher performance cache line writes, but reads are still low performance. The WT and WB memory types offer high performance cache line reads and writes but are cacheable types.

DETAILED DESCRIPTION

Figure 1:
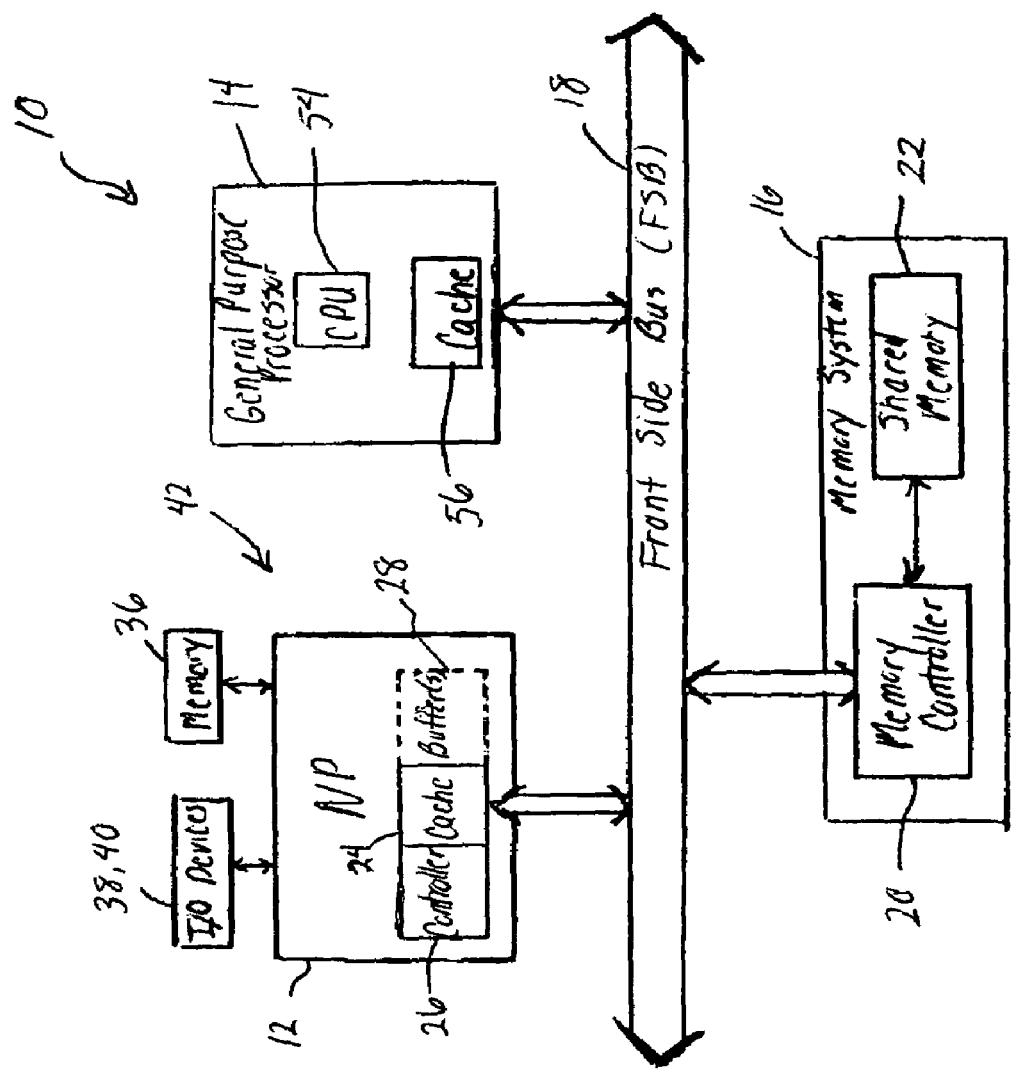
FIG. 1 is a block diagram of an exemplary multi-processor system configured in a shared memory architecture.

Referring to FIG. 1, a multi-processor system 10 includes multiple processors 12, 14 such as a network processor ("NP") 12 and a general purpose processor (GPP) 14 coupled to an external memory system 16 by a memory bus (referred to herein as a "front side bus", or "FSB") 18. The memory system 14 includes a memory controller 20, which connects to a memory 22 shared by the NP 12 and GPP 14. The NP 12 and the GPP 14 can initiate memory transactions on the FSB 18. The memory controller 20 controls accesses to the shared memory 22 by the NP 12 and the GPP 14. Although a system containing a single GPP 14 and NP 12 is depicted, it will be understood that the system 10 could include more than one GPP 14 and/or more than one NP 12 and/or processors having other architectures.

The memory system 16 is part of a cache-based memory system of the NP 12 that includes a cache 24. The cache 24 includes logic mapping different cache lines to different memory address ("tags"). The cache 24 can search this map to determine whether requested data is currently cached ("a hit") or not ("a miss"). The cache 24 is shown as an integral component of the NP 12. Also included in the NP 12 is a controller 26 to manage accesses to the cache 24 and the memory 22 (via the FSB 18 and memory controller 20). In one embodiment, as shown, the NP 12 may include one or more buffer(s) 28 (which may include a bi-directional read/write buffer, or separate uni-directional buffers, one for reads and one for writes) to provide temporary storage for data during memory transactions. Alternatively, in other embodiments that may not include buffer(s), a cache-way may be used for buffering purposes, as will be described later with reference to FIGS. 5-7.

Figure 2:
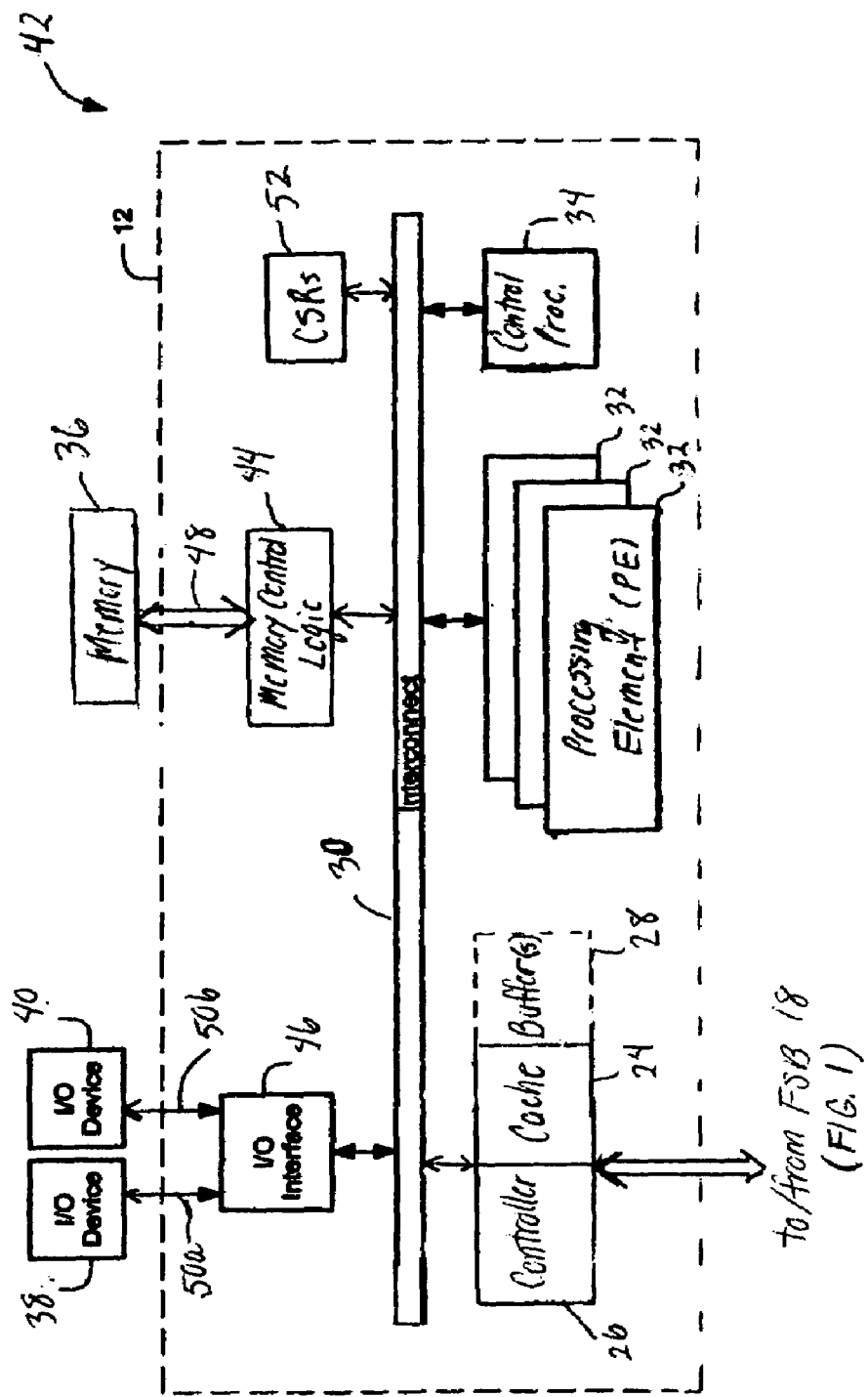
FIG. 2 is a block diagram of an exemplary processor having a cache-based memory system that includes an internal cache.

Referring to FIGS. 1-2, in addition to the controller 26, the NP 12 includes various other functional units and resources connected to an internal interconnect 30. In one exemplary embodiment, as illustrated in FIG. 2, the NP 12 includes one or more processing elements (PEs) 32, which initiate memory transactions by sending FSB memory access instructions to the controller 26 over the interconnect 30. The FSB memory access instructions specify a command type, e.g., whether the command is a read or write, as well as address and other information.

The NP 12 may include other processing devices, such as a control processor 34 (as shown in the figure) or a co-processor, also connected to the interconnect 30. The control processor 34 may be programmed, for example, to handle network protocols, exceptions, and provide support for higher layer network processing tasks.

In a network processing environment, the NP 12 may be coupled to an external memory 36 and one or more I/O devices, shown as I/O devices 38, 40. Collectively, the NP 12, memory 36 and I/O devices 38, 40 are indicated by reference numeral 42. The memory 36 may include Dynamic Random Access Memory (DRAM) and/or Static Random Access Memory (SRAM). The DRAM may be used to store large volumes of data during packet processing, e.g., payloads from network packets, whereas the SRAM may be used for low latency, fast access tasks, e.g., accessing look-up tables, storing buffer descriptors and free buffer lists, and so forth.

As illustrated in the embodiment depicted in FIGS. 1-2, the NP 12 uses a memory hierarchy that includes both a cache-based memory system and a non-cache-based memory system. In the illustrated embodiment of FIG. 2, the memory 36 could be used in the manner discussed above, and the shared memory 22 could be used to pass information between the NP 12 and the GPP 14. For example, payload data stored in DRAM in the memory 36 could be transferred to the shared memory 22 for additional processing by the GPP 14. Other types of information to be exchanged between the processors 12, 14, e.g., messages, pointers, protocol state (e.g., TCP state) and so forth, may be stored in the shared memory 22 and possibly cached in respective caches of the NP 12 and GPP 14.

The I/O devices 38 and 40 may be any network devices capable of transmitting and/or receiving network traffic data, such as framing/media access control (MAC) devices, e.g., for connecting to 10/100BaseT Ethernet, Gigabit Ethernet, Asynchronous Transfer Mode (ATM) or other types of networks, or devices for connecting to a switch fabric. For example, in one arrangement, the I/O device 38 could be an Ethernet MAC device (connected to an Ethernet network, not shown) that transmits data to the NP 12 and I/O device 40 could be a switch fabric interface that receives processed data from the NP 12 for transmission onto a switch fabric. In such an implementation, that is, when handling traffic to be sent to a switch fabric, the NP 12 would be acting as an ingress network processor. Alternatively, the NP 12 could operate as an egress network processor, handling traffic that is received from a switch fabric (via I/O device 40) and destined for another network device such as I/O device 38, or network coupled to such a device. Although the NP 12 can operate in a standalone mode, supporting both traffic directions, it will be understood that, to achieve higher performance, it may be desirable to use two dedicated NPs, one as an ingress processor and the other as an egress processor.

To support such external devices in the NP system, the NP 12 may include memory control logic 44 to control accesses to an external memory 36 and an I/O interface 46 responsible for controlling and interfacing the NP 12 to the I/O devices 38, 40. In the illustrated embodiment, the memory control logic 44 and I/O interface 46 are coupled to the interconnect 30. Memory busses 48 couple the memory control logic 44 to the external memory 36 and the I/O interface 46 is coupled to the I/O devices 38 and 40 via separate bus lines 50*a* and 50*b*, respectively. The NP 12 may include other resources, for example, control status registers (CSRs) 52, as shown. Other devices, such as a host computer, which may be coupled to an external bus controlled by a bus interface (not shown) can also be serviced by the NP 12.

The NP 12 may be a multi-threaded multi-processor NP, e.g., one based on the Intel® Internet Exchange Architecture (IXA). The processor 12 may include multiple internal PEs in the form of programmable "microengines" (MEs). The MEs may include hardware support for multi-threading (e.g., multiple program counters for the different threads). The processor 102 may also include a control processor (e.g., an XScale® or Intel® Architecture (IA) core). The processor 12 integrates the multiple cores (e.g., MEs and control processor core) and other components on the same integrated die.

In the illustrated embodiment, an NP 12 connects to the same memory system as a GPP 14 in a shared memory architecture. Such an architecture enables the NP and the GPP to collaborate on specific networking algorithms (like Intrusion Detection, Firewalling, Secure Sockets Layer acceleration, for example) in a more fine-grained manner.

The GPP 14 may be a processor that has a CPU core 54 and integrated cache 56, e.g., an Intel® Architecture processor ("IA processor") such as the Intel® Xeon™ processor, or some other CPU based, general purpose computing architecture. Other types of processor architectures could be used.

The memory 22 is shared by and common to the various agents of the system 10. The memory controller 20 controls accesses to the shared memory 22 by such agents. The memory controller 20 may serve as a hub or bridge, and therefore may include circuitry that connects to and communicates with other system logic and I/O components, which may connect to some type of backplane.

As shown in FIGS. 1-2, the NP 12 and the GPP 14 each include a respective cache 24, 56. The size and organization of the caches are matters of design choice. For example, each cache may be organized as an N-way set associative cache, with each set including some number of blocks, also known as "cache lines", of a given fixed size. The NP 12 and GPP 14 use their respective caches to hold local copies of recently accessed data from the shared memory 22, to reduce memory bus bandwidth used by the processors 12, 14.

The NP 12 and GPP 14 each has the ability to monitor or "snoop" the other processor's accesses to the shared memory 22 and to their internal caches 24, 56. The snooping mechanism keeps individual processors' internal caches 24, 56 consistent both with the shared memory 22 and with the caches in other processors on the FSB 18. In one exemplary embodiment, as described herein, the snooping cache coherency protocol that is used is the MESI protocol, where "MESI" refers to the four cache states "modified" (M), "exclusive" (E), "shared" (S), and "invalid" (I). Each cache line in the cache can be in one of the four states. In the NP 12, the controller 26 includes logic to ensure that coherency is maintained between the cache 24 and the shared memory 22 as well as between the cache 24 and the cache 56 (in the GPP 14).

The GPP 14 uses both page cachability attributes and Memory Type Range Registers (MTRRs) to determine cache attributes of memory accesses. The MTRRs allow the type of caching to be specified in the shared memory for selected physical address ranges.

Networking applications of an NP typically are characterized as having some portion of data references that have good temporal locality (e.g., control data references) and some other portion that have poor temporal locality and a large working set (e.g., packet data). To achieve high performance for networking applications, therefore, the NP 12 includes a mechanism to define cacheability of memory accesses on a per-instruction basis. This mechanism provides for cache-able accesses and uncached accesses, as will be described.

Figure 3:
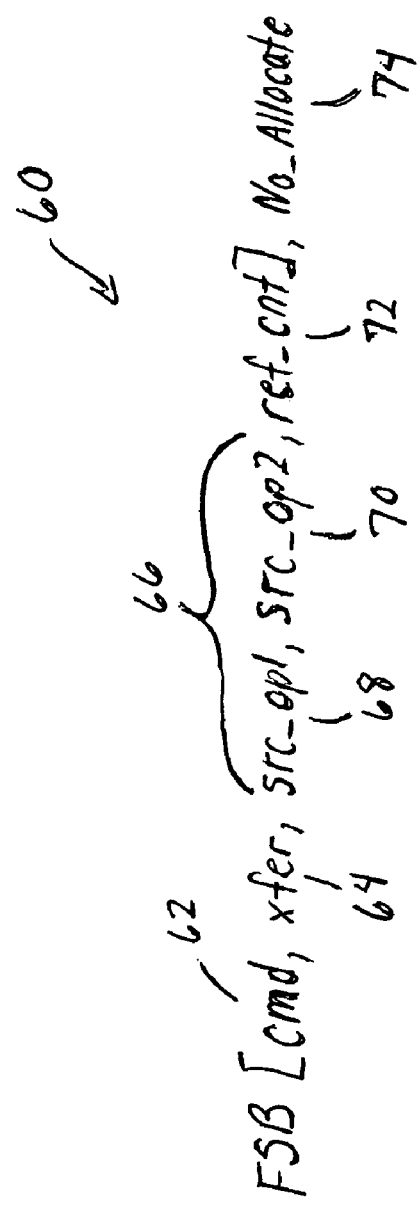
FIG. 3 shows a format of an exemplary memory access instruction that includes an optional token to specify a "no allocate" cache policy.

In one exemplary embodiment, shown in FIG. 3, a FSB memory access instruction 60 is defined to include the following parameters: a command ("cmd") 62; a source/destination transfer register ("xfer") 64; memory address information 66, shown here to include a first source operand parameter 68 ("src_op1") and a second source operand parameter 70 ("src_op2") to define a memory address; and a reference count ("ref_cnt") 72. The instruction 60 takes as an optional parameter a "no allocate" ("No_Allocate") token 74. When the "no allocate" token is included in a FSB memory access instruction, the FSB memory access instruction specifies an "uncached" memory access, which causes the controller 26 to initiate an FSB transaction to access the shared memory 22 without cache line allocation on a cache line miss. Data is thus transferred between the shared memory 22 and the requestor in a way that by-passes the cache. Such data, referred to herein as "uncached" or "no allocate" data, may be buffered in some manner, for example, in one of the buffers 28 (or cache-way, as will be discussed later). The FSB memory access instruction may include other tokens as well, e.g., tokens that specify if the address is an indirect reference, whether to signal completion of the transaction, and so forth. Augmenting the NP instruction set with a "no allocate" attribute for memory reads and writes in this manner gives the programmer fine-grained control over high performance transactions that by-pass the cache.

Table 1 below defines a NP cache allocation policy, according to the described embodiment, that encompasses both the MTTR and the "no allocate" mechanism. The memory types of the MTTRs, by themselves, do not provide high performance reads/writes that by-pass the cache. Nor do they allow a programmer to specify cache-ability for individual reads and writes, as they are specific to address regions. As indicated in the table, a "no allocate" token means that no cache line allocation will occur in the event of a cache line miss, regardless of the selected memory type.

TABLE 1

| Allocate or No Allocate | Selected Memory Type | Allocate Cache Line on Read Miss? | Allocate Cache Line on Write Miss? |
|---|---|---|---|
| Allocate | WB | Yes | Yes |
| Allocate | WT, WP | Yes | No |
| Allocate | UC, WC | No | No |
| No Allocate | Any | No | No |

The controller 26 monitors FSB accesses from other processors, such as the GPP 14, and responds as required to keep the cache 24 and other processor's caches coherent. This snooping activity is handled by hardware in the controller 26, and is transparent to software. Snoops that miss the cache 24 report a snoop miss on the FSB and do not modify the contents of the cache 24 in any way. The snoop response can indicate a hit for addresses that are not actually in the cache, since the controller 26 maintains coherency for data from the point in time that it has initiated a FSB read for data it intends to modify, until the data is written out on FSB. The modified data could be in flight from memory, in the shared memory, in the cache 24, in the process of being evicted from the cache 24, and so forth. The controller 26 will stall snoop responses when the address hits a locked cache line.

Figure 4A:
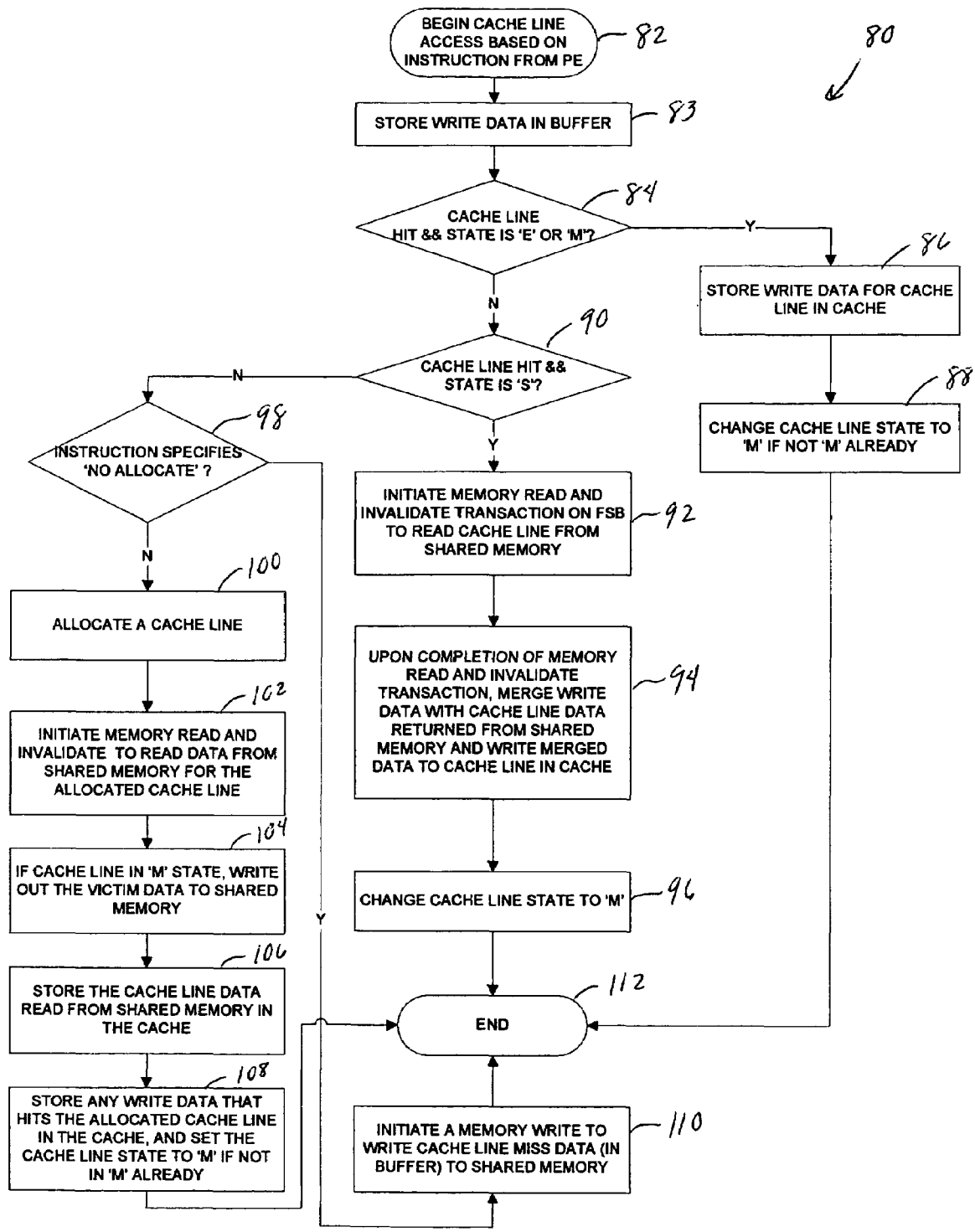
FIGS. 4A-4B are flow diagrams illustrating exemplary operations of a controller to access cache lines for memory access instructions formatted to support the "no allocate" cache policy.
Figure 4B:
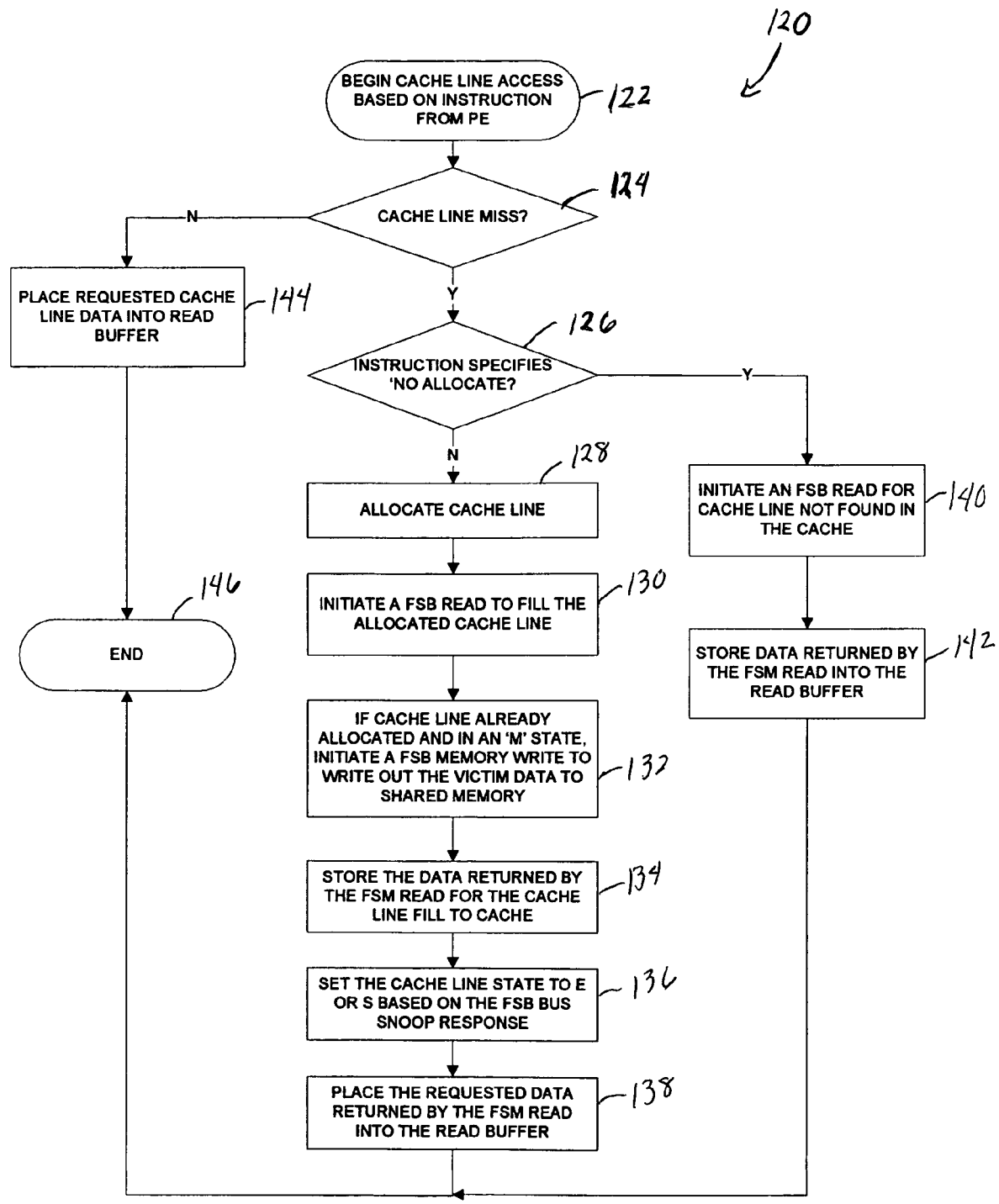

FIG. 4A and FIG. 4B provide an example memory write and memory read (for a cache line access), respectively, that incorporate the "no allocate" feature. Referring to FIG. 4A, the controller 26 begins 82 a cache line access based on an FSB memory access instruction from an NP agent (such as a PE, as shown). The controller 26 stores 83 the write data in a buffer. The controller 26 determines 84 if the write data "hits" a cache line and the state of the cache line is 'E' or 'M'. If so, there is no need to initiate a bus transaction on the FSB. The controller 26 writes 86 the data into the cache line, and changes 88 the cache line state from 'E' to 'M' (or leaves the state unchanged if in the 'M' state already). If the controller determines 90 that data hits the cache line and the cache line state is 'S', then the controller initiates 92 a FSB Memory Read and Invalidate on the FSB. When that transaction has completed, the controller causes 94 the write data to be merged into the cache line returned from shared memory and the merged data to be written into the cache. The controller changes 96 the cache line state to 'M'.

If the event of a cache line miss, the controller determines 98 if the instruction specifies a "no allocate" cache allocation policy by including a 'no allocate' token. If the cache allocation policy is 'write allocate', that is, no 'no allocate' token is provided by the FSB instruction, the controller 26 allocates 100 a cache line for the cache line miss, and initiates 102 a FSB read to fill that cache line. The FSB read uses a request type of Memory Read and Invalidate and attribute of WB. The controller initiates 104 a FSB Memory Write to write out the victim data to the shared memory if the allocated cache line is in an 'M' state. As the data for the cache line fill is returned on the FSB, the controller stores 106 that data in the allocated line in the cache. The controller 26 writes 108 the cache line with the write data that hit the allocated cache line, and sets the cache line state to 'M' (if not set to 'M' already). If, at 98, it is determined that the cache allocation policy is 'no allocate', the controller 26 initiates 110 a FSB memory operation to write the cache line miss data to the shared memory for the addresses not found in the cache. The FSB write uses request type of Memory Write and attribute of WT. After any one of blocks 88, 108 and 110, the controller 26 terminates 112 its operation for the memory write access.

Referring to FIG. 4B, details of a memory read access 120, according to one exemplary implementation, are shown. The controller 26 begins 122 a cache line access based on an FSB instruction from an agent (such as a PE, as shown). The controller 26 determines 124 if the addressed data is not in the cache. If so, the controller checks 126 the cache allocation policy to determine if the 'no allocate' token is provided in the FSB memory access instruction. If the cache allocation policy is 'read allocate', that is, the 'no allocate' token is not provided, the controller 26 allocates 128 a cache line for the cache line miss and initiates 130 a FSB read to fill that allocated cache line. The FSB read uses a request type of Memory Data Read and attribute of WB. For a line that was previously allocated, if the line was in 'M' state, the controller initiates 132 a FSB Memory Write to write out the victim data to the shared memory. As the data for the cache line fill is returned on the FSB, the controller stores 134 it in the allocated line in the cache, and sets 136 the cache line state to 'E' or 'S', depending on the FSB bus snoop response ('E' if not found in another cache, 'S' if it was found in another cache). Also, the controller stores 138 in the read buffer the data words that were requested by the FSB read instruction. If, at 126, the controller determines that the cache allocation policy is 'no allocate' ('no allocate' is specified in the original FSB instruction), the controller initiates 140 an FSB read for the block of addresses (that is, the cache line) not found in the cache. The FSB read uses a request type of Memory Data Read and attribute of WB. As the data for the read is returned on the FSB, the controller stores 142 the data in the read buffer but not in the cache. If, at 124, the controller detects a cache line hit, the controller transfers 144 the requested data in the cache line to the read buffer. Once the requested read data is in the read buffer (after any of blocks 138, 142 and 144), it is made available to the requesting agent, and the controller terminates 146 its read operation.

The "no allocate" transactions are marked on the FSB as an existing high performance memory type (either WT or WB), but also by-pass the cache internal to the NP 12. This cache by-pass may be implemented with several different mechanisms. In one embodiment, as described above, read and write buffers (such as buffers 28, shown in FIGS. 1-2) external to the cache may contain short-lived copies of the uncached data as that data moves between the FSB and the requesting agent. The controller 26 manages the coherency of the uncached, high performance memory region. The GPP 14 and memory controller 20 on the FSB 18 will consider the memory to be cacheable (as specified with the memory attribute WT or WB) and must be disallowed in software from caching the blocks corresponding to the addresses of the uncached data when the NP is working on that data. This may be accomplished through traditional techniques, such as using a coherent memory semaphore to pass control of the memory region between different processors. In addition, the controller 26 may employ a facility or include logic to manage the posted writes in the write buffer to ensure that all NP agents have a consistent view of the shared memory.

Figure 5:
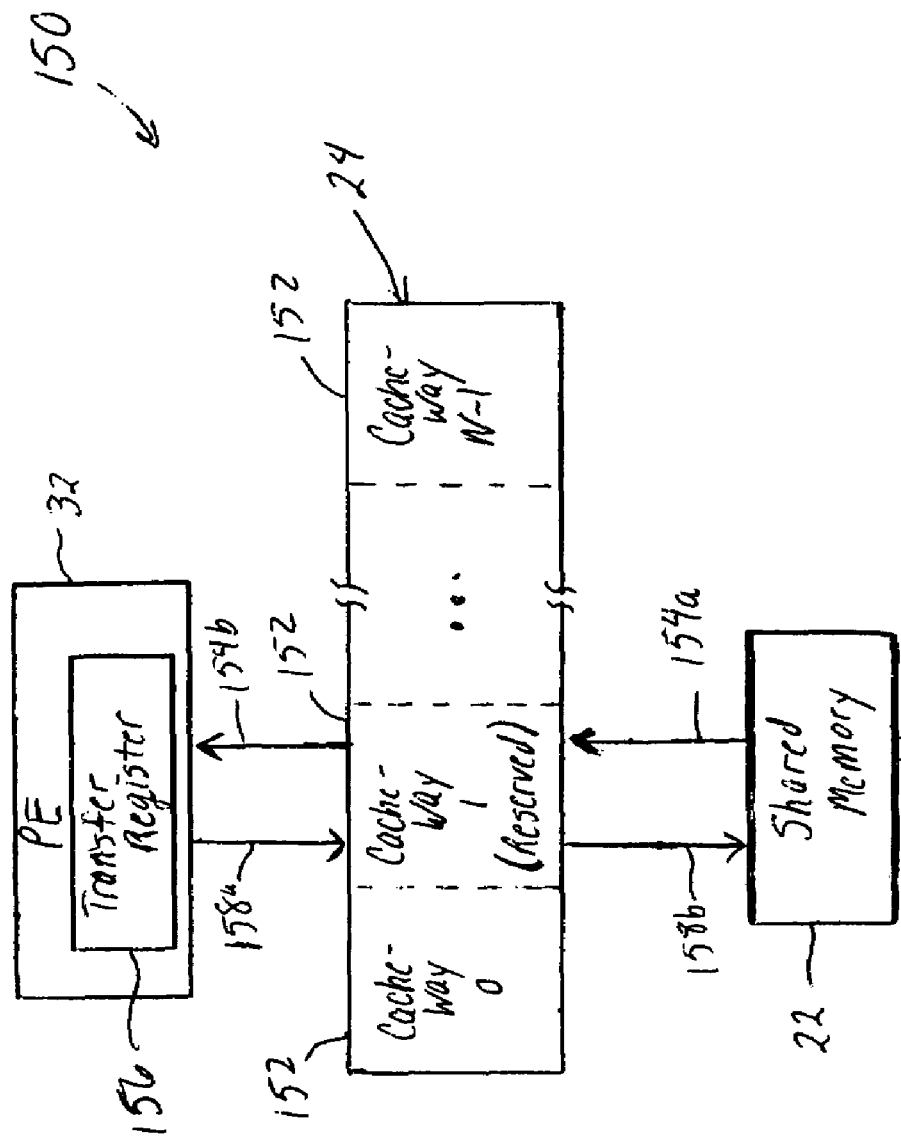
FIG. 5 depicts an exemplary embodiment in which a cache-way is dedicated for use as a read/write buffer.

In an alternative embodiment, a particular cache-way may be used to buffer the uncached data. FIG. 5 depicts a "no allocate" data transfer 150 between a requesting agent (such as a PE, as shown) and the shared memory for uncached read and write data. As shown, the cache 24 is divided into 'N' cache-ways 152. One of the cache-ways—for example, cache-way 1 (indicated as "reserved")—is dedicated for use as a read/write buffer. The reserved cache-way is used to buffer uncached read and write data for each FSB transaction occurring as a result of a cache line miss when the FBS memory access instruction specified a "no allocate" cache allocation policy. Read data are stored in the reserved or fixed cache-way for "no allocate" read bus transactions. For example, as indicated in the figure by arrows 154a and 154b, uncached read data is transferred from the shared memory to the reserved cache-way and from the reserved cache-way to a location specified by the requesting agent. If the requesting agent is a PE, the FSB memory access instruction parameter "xfer" 64 (from FIG. 3) specifies a transfer register 156 in which the data is to be written.

Still referring to FIG. 5, the reserved cache-way is designated a WT region for writes. Thus, for "no allocate" write bus transactions, cache lines to be written to the FSB are posted in the cache-way/write buffer for transfer to the shared memory at the appropriate time. In the illustrated example, arrows 158a and 158b indicate the transfer of uncached write data from transfer register to reserved cache-way to shared memory. Controller hardware enforces the coherency of cache lines in the reserved cache-way as for other WT memory regions.

Figure 6:
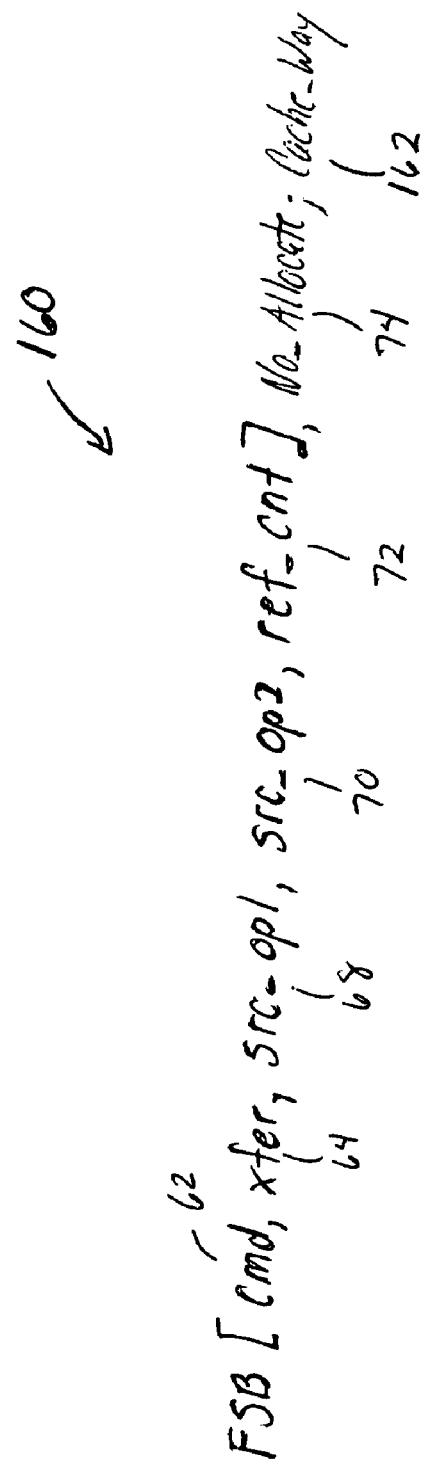
FIG. 6 shows a format of an exemplary memory access instruction that includes optional tokens to specify a "no allocate" cache policy and to select a cache-way as read/write buffer for the "no allocate" cache policy.

In still yet another embodiment, a variable cache-way may be used. The selection of cache-way as buffer may be specified in the FSB memory access instruction, according to one embodiment. Referring to FIG. 6, to support the use of a cache-way that is selected on a per-instruction basis, an FSB memory access instruction 160 may be defined to include an additional parameter, a cache-way ("Cache_Way") token 162, as a cache-way attribute to specify a cache-way to use as a buffer. Thus, and referring back to the cache-ways of FIG. 5, it may be possible to specify one cache-way, e.g., cache-way 1, for one FSB memory access instruction and a different cache-way, such as cache-way N−1, for another FSB memory access instruction. As in the case of the fixed cache-way, the corresponding memory region is designated as WT or WD. The uncached read data are stored into the instruction-specified cache-way (serving as a read buffer). The uncached writes are posted in the instruction-specified cache-way (serving as a write buffer). With the variable cache-way, the programmer has greater control over the cache-way selected for eviction. It is desirable to manage the cache-ways so as not to evict data that is likely to be revisited. It will be appreciated that the programmer may restrict the use of the variable cache-way to a dedicated cache-way by simply specifying the same cache-way in each FSB memory access instruction containing a "no allocate" token. Although the cacheability tokens 74 and 162 have been discussed as programmer-specified parameters, it will be understood that one or both of the tokens may be generated at run-time or compile time.

In the case of both variable and fixed cache-way buffer mechanisms, the controller 26 may discard the cache-way data after such data has been consumed by the requesting agent (for a read) or flushed to the shared memory (for a write) by marking the associated cache line status as invalid. This status serves to notify other agents that the data may be overwritten.

The "no allocate" feature as described herein enables a NP connected to a GPP front side bus to have both a caching store for sharing data with high locality (e.g., connection state data) and an uncached store for sharing data with known low locality (such as packet data) without evicting high locality data. When the NP programmer knows the working set is smaller than the cache size, the programmer can use the existing, cache-able, high performance memory types (like WB and WT). If, however, the working set for a portion of the computation is larger than the cache size, the programmer can choose high-performance, uncached reads and writes provided by the "no allocate" mechanism.

The programmer-controlled partitioning of memory into cached and uncached memory locations and programmer-controlled cache-ability for each instruction based on a parameter for instructions that reference memory enables high performance networking applications, in particular, those in which the NP and the GPP collaborate over the FSB, by increasing the transfer size (and therefore the bus efficiency and performance) to uncached regions.

Figure 7:
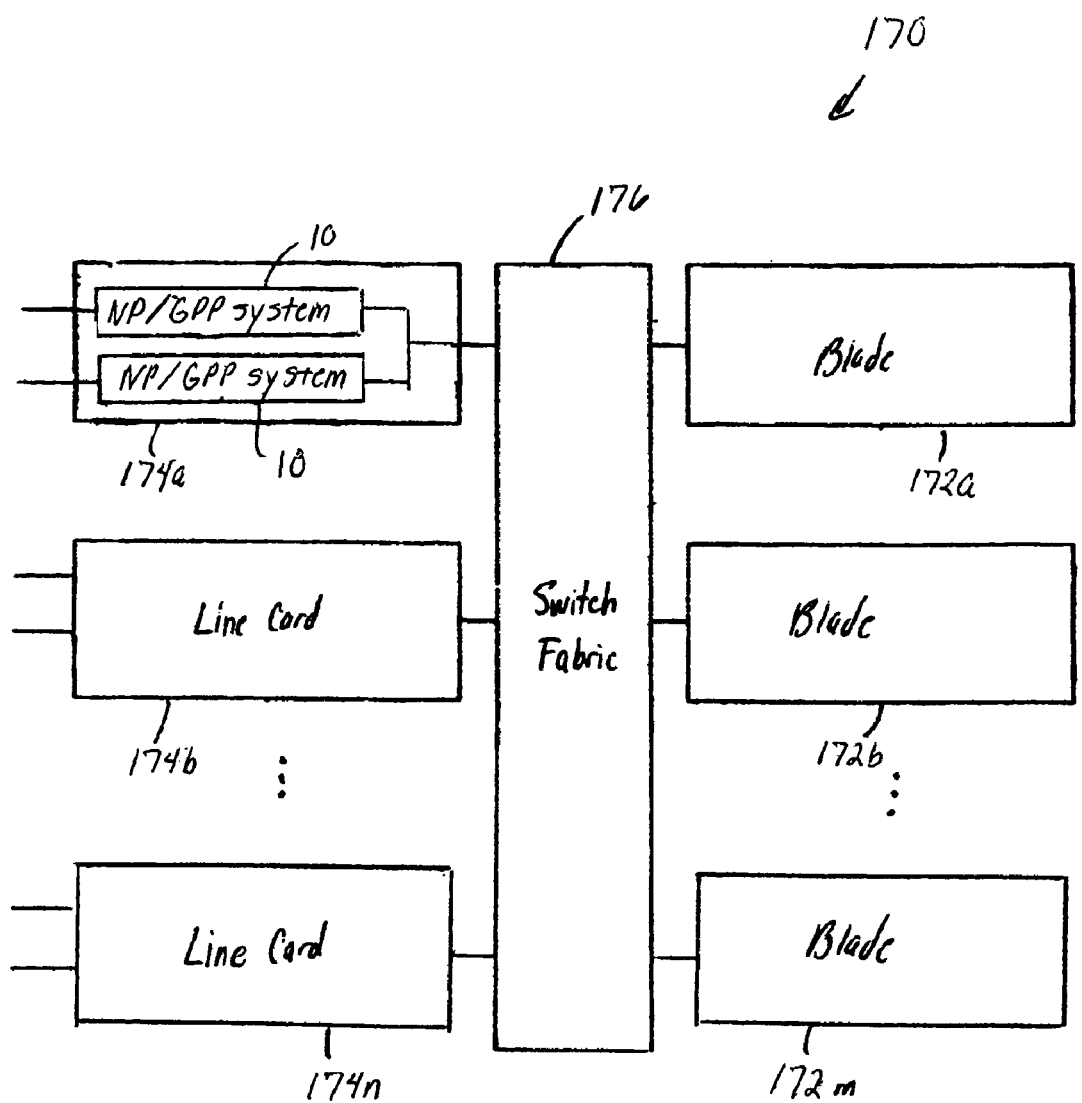
FIG. 7 is a block diagram of an exemplary networking application in which a multi-processor system such as that shown in FIGS. 1-2 is employed.

The system 10 (of FIGS. 1-2) with any one or more of the buffering options shown in FIGS. 1-2, and 5-7, as described above, may be used in a variety of applications. For example, as shown in FIG. 7, a distributed processing platform 170 includes a collection of blades 172a-172m and line cards 174a-174n interconnected by a backplane 176, e.g., a switch fabric (as shown). The switch fabric 176, for example, may conform to Common Switch Interface (CSIX) or other fabric technologies such as HyperTransport, Infiniband, Peripheral Component Interconnect (PCI), Packet-Over-SONET, RapidIO, and/or Universal Test and Operations PHY Interface for ATM (UTOPIA).

The line card is where line termination and I/O processing occurs. It may include processing in the data plane (packet processing) as well as control plane processing to handle the management of policies for execution in the data plane. The blades 172a-172m may include: control blades to handle control plane functions not distributed to line cards; control blades to perform system management functions such as driver enumeration, route table management, global table management, network address translation and messaging to a control blade; applications and service blades; and content processing. In a network infrastructure, content processing may be used to handle intensive content-based processing outside the capabilities of the standard line card applications including voice processing, encryption offload and intrusion-detection where performance demands are high.

In networking applications, for example, it is possible to bring packet processing and general purpose processing closer together for optimal, high-throughput communication between packet processing elements of a NP and the control and/or content processing of GPPs. Thus, at least one of the line cards, e.g., line card 174a, may be a specialized line card that is implemented based on the architecture of system 10, to more tightly couple the processing intelligence of a GPP to the more specialized capabilities of a NP. The line card 174a may include a first system 10 to handle communications between network connections and the switch fabric 176 for inbound traffic as an ingress processor and a second system 10 to handle communications between switch fabric 176 and network connections for outbound traffic as an egress processor, although a single system could be used to handle processing in both directions. Depending on the configuration of blades and line cards, the distributed processing platform 170 could implement a switching device (e.g., switch or router), a server, a datacenter or other type of equipment.

Other embodiments are within the scope of the following claims. For example, while the "no allocate" feature is described within the context of a networking application, it may be applicable to streaming media (and other higher performance) applications as well. Additionally, instead of a "no allocate" feature, an "allocate" feature could be provided where the default is a "no allocate" operation. The techniques described above may be implemented in a variety of logic. The term logic as used herein includes hardwired circuitry, digital circuitry, analog circuitry, programmable circuitry, and so forth. The programmable circuitry may operate on instructions disposed on an article of manufacture (e.g., a volatile or non-volatile memory device).

What is claimed is:

1. A method comprising:
providing a memory access instruction of a processing element's instruction set including multiple parameters, the parameters including at least one address and a token specifying whether the instruction should cause data retrieved from memory in response to the memory access instruction to be unavailable to a subsequent memory access instruction via a cache.

2. The method of claim 1,
wherein, if the token specifies the data to be unavailable to a subsequent memory access instruction via the cache, the memory access instruction does not result in a cache line fill.

3. The method of claim 1,
wherein the data retrieved from memory is stored in a memory buffer that is not part of the cache.

4. The method of claim 3,
wherein, if the token specifies the data to be unavailable to a subsequent memory access instruction via the cache, the data retrieved from memory is stored in a portion of the cache and marked as invalidated.

5. The method of claim 4, wherein the instruction comprises a parameter to identify the portion of the cache.

6. The method of claim 1, wherein the processing element comprises one of a set of multiple programmable cores integrated on a single die.

7. The method of claim 6,
wherein the cache comprises a cache integrated with the multiple programmable cores on the single die.

8. The method of claim 1,
further comprising generating the instruction in response to source code.

9. The method of claim 1,
wherein the memory comprises memory operation shared by processors having different processor architectures.

10. An article of comprising a computer-readable storage medium having stored thereon instructions that when executed by a computer result in the following: specifying, via a token, whether at least one memory access instruction of a processing element's instruction set should cause data retrieved from memory in response to the memory access instruction to be unavailable to a subsequent memory access instruction via a cache, the at least one memory access instruction of a processing element's instruction set including multiple parameters, the parameters including at least one address and the token.

11. The article of claim 10,
wherein, if the token specifies the data to be unavailable to a subsequent memory access instruction via the cache, the memory access instruction does not result in a cache line fill.

12. The article of claim 10,
wherein the data retrieved from memory is stored in a memory buffer that is not part of the cache.

13. The article of claim 12,
wherein, if the token specifies the data to be unavailable to a subsequent memory access instruction via the cache, the data retrieved from memory is stored in a portion of the cache; and
the portion of the cache is immediately invalidated.

14. The article of claim 13,
wherein the instruction comprises a parameter to identify the portion of the cache.

15. The article of claim 10,
wherein the processing element comprises one of a set of multiple programmable cores integrated on a single die.

16. A processor, comprising:
a cache; and
multiple programmable cores, the cores and the cache being integrated on the same die, at least one of the multiple programmable cores having an instruction set that includes a memory access instruction including multiple parameters, the parameters including at least one address and a token specifying whether the instruction should cause data retrieved from memory in response to the memory access instruction to be unavailable to a subsequent memory access instruction via a cache.

17. The processor of claim 16,
wherein, if the token specifies the data to be unavailable to a subsequent memory access instruction via the cache, the memory access instruction does not result in a cache line fill of the cache.

18. The processor of claim 16,
wherein the data retrieved from memory is stored in a memory buffer that is not part of the cache.

19. The processor of claim 18,
wherein, if the token specifies the data to be unavailable to a subsequent memory access instruction via the cache, the data retrieved from memory is stored in a portion of the cache; and
the portion of the cache is immediately invalidated.

20. The processor of claim 19,
wherein the instruction comprises a parameter to identify the portion of the cache.

21. A system, comprising:
a first processor;
a second processor;
a memory;
a bus interconnected the memory, the first processor, and the second processor;
a cache;
at least one of the first and second processors providing a memory access instruction including multiple parameters, the parameters including at least one address and a token specifying whether the instruction should cause data retrieved from memory in response to the memory access instruction to be unavailable to a subsequent memory access instruction via a cache.

22. The system of claim 21,
wherein, if the token specifies the data to be unavailable to a subsequent memory access instruction via the cache, the memory access instruction does not result in a cache line fill of the cache.

23. The system of claim 21,
wherein the data retrieved from the memory is stored in a memory buffer that is not part of the cache.

24. The system of claim 21,
wherein the data retrieved from memory is stored in a portion of the cache.

25. The system of claim 24,
wherein the instruction comprises a parameter to identify the portion of the cache.

* * * * *